2,071,591

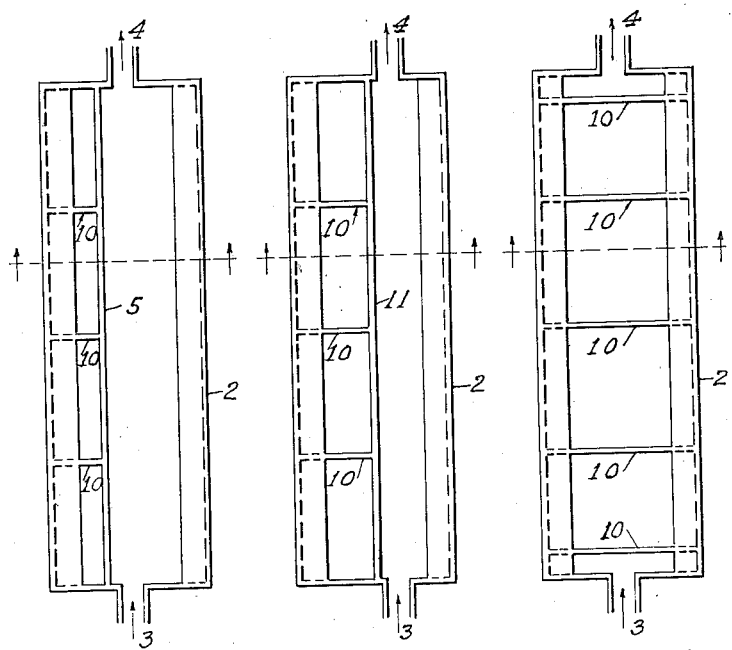
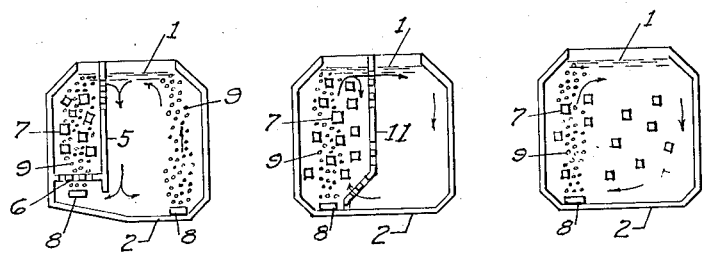
Fig.1  Fig.3  Fig.5
Fig.2  Fig.4  Fig.6
Inventor:-
Albert L. Tholin Patented Feb. 23, 1937

UNITED STATES PATENT OFFICE 2,071,591

SEWAGE TREATMENT

Albert L. Tholin, La Grange, Ill.

Application December 2, 1935, Serial No. 52,561

6 Claims. (Cl. 210—8)

This invention relates to the treatment of sewage, trade wastes or similar liquids and it pertains more particularly to the secondary treatment of such liquids by bio-chemical means.

Hereinafter the word sewage will be used in this specification to designate the liquid to be treated, it being understood that trade wastes or other similar liquids may also be treated by means of this invention to accomplish their purification.

In the present day practise of the art of sewage treatment, the sewage is first subjected to preliminary or primary treatment processes. These primary processes include grit removal, coarse or fine screening, skimming, and plain sedimentation. When a higher degree of purification is desired than can be obtained by the primary processes, a process of secondary or more complete treatment must follow the primary processes.

The sewage, after primary treatment, still contains impurities in a finely divided or colloidal form or in solution. To remove these impurities requires biological and/or chemical reactions.

In some cases chemical precipitation without biological action has been used and produced sufficient purification to meet local needs. More often, however, some form of bio-chemical, aerobic process is desirable.

The bio-chemical aerobic processes are characterized by the presence, as active agents of purification, of countless living organisms, which, living under the aerobic conditions maintained in the process, feed upon the impurities in the sewage, and by their life processes convert these impurities into more stable compounds, and to forms which are readily removable by sedimentation. These bio-chemical aerobic processes can be divided into two classes according to the method by which contacts are provided between the biological organisms and the sewage.

In the first class are the methods or processes which employ fixed surfaces upon which the helpful organisms may dwell and react upon the sewage passing by, along or around these surfaces. In this class is the trickling filter, which consists preferably of a bed of coarse stone on the surface of which is distributed, in intermittent doses, the partially treated sewage from some primary process of treatment and then allowed to trickle downward through the bed to a system of under drains which lead to a secondary or final sedimentation tank. In this class also is the intermittent sand filter which employs finer material than the trickling filter but requires relatively larger areas and frequent cleaning of the surface of the filter. Other processes of this type are known but need not be described herein. Processes in this class are simple in operation, but are costly to construct and have periods of uncertain results, due to the sloughing off or unloading of accumulated growths on the surfaces. They are also subject to occasional clogging of the voids in the filter material.

In the second class, is the process now commonly known as the activated sludge process which does not employ fixed surfaces for biological growths but comprises the circulation of these growths, en masse, through the sewage.

In this process the partially treated sewage from a primary treatment process is mixed with some activated sludge which has been built up in the previous operation of the process. This mixture of activated sludge and partially treated sewage enters an aeration tank and circulates in this tank at non-settling velocities, moving gradually and continually to the outlet end of the tank from whence the mixture is conducted to the final sedimentation tanks. A portion of the sediment, known as sludge, from the final sedimentation tank is returned continually to mix with new increments of partially treated sewage entering the aeration tanks. This return sludge must be carefully maintained in the proper condition, or the process loses its efficiency.

Compared with the processes which employ fixed surfaces, the activated sludge process is less costly to construct, but more costly to operate. The high cost of operation is due to the large amount of power required for aeration of the mixed liquor and recirculation of the sludge.

It is customary in the present practise of activated sludge treatment to provide sufficient volume in the aeration tanks to produce a detention period of five to six hours, based upon the sewage alone and an additional volume for the return sludge. The ratio of return sludge to incoming sewage is generally about 1 part of sludge to 5 parts of sewage. In other words the volume of the aeration tank must equal one and one-fifth times the volume of sewage entering the tank in a five or six hour period. With average American sewage the use of a detention period less than five hours has produced unsatisfactory results.

My invention comprises a process in which aeration and bio-chemical action are carried on without the use of fixed surfaces as in the trickling filter and without the return of sludge as used in the present activated sludge process. This is accomplished by the provision of mobile surfaces remaining, at all times, within the aeration tank, while the sewage passes continually through the tank. I prefer to provide these mobile surfaces in the form of rubber sponges, but natural sponges or other material of similar structure may also be used in this process.

Hereinafter, the word sponge will be used to indicate, not only the rubber sponges, which I prefer, but any highly porous, resilient material, having the usual characteristics of a sponge, especially the quality of imbibing and expelling fluids when subjected to variations in pressure, while immersed in said fluids, and which will be resistant to decomposition or abrasion, and will be freely mobile in the liquid, as hereinafter described.

The large amount of contact surface provided by each cubic inch of sponge, together with the frequency of contact provided, due to the moving of the sponges relative to the sewage, permits a speed of purification heretofore unobtainable in an aeration process. Consequently, the volume of the aeration tank used in my invention is much less than the volume required for the present activated sludge process.

By reducing the volume of tank required the construction cost of a sewage works of a given capacity is reduced below the cost of any present process producing similar results. Due to the shorter detention period and the elimination of sludge return, the cost of operation is also reduced.

Results obtained in the operation of my invention at the treatment works of the Downers Grove Sanitary District in Illinois prove that with a one hour detention period in the aeration tank, the amount of purification accomplished, expressed as the percent of reduction of the five day biochemical oxygen demand, was 50%; that with a two hour detention period the reduction was 75%; and with a three hour detention period the reduction was 85%. These results prove that the process is flexible; that plants may be designed to fit the degree of treatment required and that with the provision of a detention period of three hours, the degree of purification is comparable to the results obtained by the present activated sludge process, with a detention period of five to six hours.

The following example will illustrate the way in which my invention can be practiced in the design of a sewage treatment works:

The dry weather sewage flow from a city averages one million gal. per day. There are no trade wastes entering the sewers which appreciably alter the characteristics of the sewage from that of ordinary domestic sewage. The sewers of the city discharge into a stream of such small proportions that in order to maintain proper stream conditions it is necessary to provide a high degree of treatment for the dry weather flow.

The design of the treatment works will first of all provide a coarse bar screen for the removal of coarse material such as sticks, rags, garbage etc. Following the coarse screen will be a combined skimming and sedimentation tank. Here the grease and oil will be skimmed from the surface and all easily settleable solids will be removed by sedimentation. The tank provided for the primary sedimentation will have sufficient volume to produce a detention period of one hour. The sediment or sludge from this tank will be removed at frequent intervals throughout each day to a sludge digestion tank. After digestion the sludge will be dried on sand beds and removed to waste land or used as fertilizer.

To further treat the liquid leaving the primary sedimentation tank is the particular function of my invention. There will be provided an aeration tank with a liquid capacity of 16,670 cu. ft., which is sufficient to provide a three hour detention period for the dry weather sewage flow. The aeration will be provided preferably by means of diffused air in the manner shown on the accompanying drawing. If however, the local officials are more familiar with or for some other reason prefer aerators of the mechanical type, these may give satisfactory results, but may, also, require a somewhat longer detention period, and consequently, a larger tank.

In this aeration tank will be placed thousands of sponges. The volume occupied by these sponges if measured in a loosely compacted pile, will approximate 20% of the volume of the tank or 3,330 cu. ft. The actual water displacement, of course, will be only a fraction of this, due to the large amount of voids in the sponges. They will be free to move or shift about under the impulse of the aeration or the currents set up thereby in the liquid. They may be kept within the tank by means of suitable screens and/or partitions while the sewage moves gradually, and continually through the tank.

On the interior and exterior surfaces of these sponges will dwell countless organisms, including many forms of aerobic bacteria, which organisms will feed upon the impurities in the sewage and upon each other so as to convert the finely divided suspended matter, the colloids and some of the soluble compounds contained in the partially treated sewage, into other forms of material which are readily separated from the liquid by sedimentation. It will require a period of two to four weeks, after commencing operation of the treatment works, for these organisms to multiply, and develop their maximum efficiency. After this initial starting period the process will continue steady, as long as the tank remains in operation.

After leaving the aeration tank the liquid containing these impurities which have been converted into settleable forms by my invention will then be conducted to a final sedimentation tank. The final sedimentation tank will have a volume sufficient to provide a two hour detention period for the average dry weather sewage flow. The sludge from the final sedimentation tank will be handled and disposed of in the same manner as the sludge from the primary sedimentation tank.

In order to further illustrate the method and apparatus, whereby my invention may be applied to the practice of sewage treatment, reference will be made to the accompanying drawing.

The apparatus necessary for primary treatment of the sewage before entering the aeration tank and the apparatus necessary for final sedimentation, after aeration, are not shown in the drawing, as apparatus for these purposes are already well known to those engaged in the art of sewage treatment. The drawing, therefore, is limited to the illustration of the aeration tanks.

Figures 1 and 2 show the preferred embodiment of my invention. Figures 3 and 4 show another embodiment of my invention, wherein the sponges are given greater freedom of movement. Figures 5 and 6 show a third embodiment, wherein the sponges are free to move throughout the entire tank. Figures 1, 3, and 5 are plan views of the aeration tanks and Figures 2, 4, and 6 are transverse sections through the tank at the dotted lines shown on the respective plan views.

In each of the three embodiments, the sewage (1) flows continually through the tank (2) from the inlet (3) to the outlet (4).

Referring to Figures 1 and 2, there is provided, within the tank (2), a longitudinal partition (5), from end to end of the tank (2), and a perforated false bottom (6), between this partition (5) and the nearer wall. Openings are provided in the upper portion and under the partition (5) to allow circulation of the sewage.

The space between the partition (5) and the nearer wall, and above the false bottom, I shall refer to as the sponge compartment. Into this compartment are placed a large number of sponges (7). Just below the sponge compartment is placed a row of air diffusors (8). Air, delivered to these diffusors (8), under sufficient pressure to overcome the effect of their submergence, rises in the form of bubbles (9), through the sponge compartment. This causes the sewage (1) in the tank (2) to circulate through the sponge compartment. Near the bottom of the tank wall opposite the sponge compartment, is placed another row of diffusors (8), which also discharge air bubbles (9) and maintain sufficient motion in the remainder of the tank (2), to prevent sedimentation, to accomplish thorough mixing of the liquid and aid in maintaining aerobic conditions. Transverse partitions (10) may be provided within the sponge compartment to prevent the sponges from shifting to the outlet end of the tank.

This particular embodiment allows for control of the upward velocities through the sponge compartment, by controlling the amount of air supplied to the diffusors (8) below. A low velocity may be maintained in the sponge compartment, while, at the same time, non-settling velocities, or velocities, in excess of one foot per second, can be maintained in the remainder of the tank (2).

Referring to Figures 3 and 4, which show a second embodiment of my invention, the tank (2) is divided by a longitudinal partition (11), vertical in its upper portion and inclined in its lower portion, toward the diffusors (8). Openings are provided in the upper and lower portions of the partition (11). These openings are of such a size and number as to allow easy circulation of the sewage (1), and yet restrict the movement of the sponges (7) to that portion of the tank (2), above the diffusors (8). The air bubbles (9), rising from the diffusors (8), cause the sewage (1) to move with a spiral motion and at non-settling velocities through the tank (2). As in Figures 1 and 2, transverse partitions (10) may be provided to prevent the sponges from being drawn or moved toward the outlet end of the tank.

Referring to Figures 5 and 6, which show a third embodiment of my invention, the sponges (7) are allowed to circulate with the sewage (1), throughout the entire tank (2), but are restrained from passing out of the tank (2) by perforated transverse partitions (10). The motion of the air bubbles (9) and the sewage (1) is the same as in Figures 3 and 4.

This last embodiment, which gives complete freedom of movement to the sponges, and is the simplest in construction, may be particularly adaptable for use in applying my invention to existing tanks, now operating under other processes of sewage treatment.

While each of the embodiments, shown in the drawing, employs diffused air, as a means of aeration and agitation, it should be understood that mechanical devices could be used for agitation and for aeration, instead of diffused air.

Various other modifications will be apparent to those skilled in the art. For instance, the location of the sponge compartment or the diffusors might be varied and I do not limit myself to any of the details hereinabove set forth except as defined by the following claims, which should be construed as broadly as the prior art will permit.

I claim:

1. A bio-chemical aerobic process of secondary treatment of sewage, trade wastes or similar liquids which comprises; passing such a liquid through an aeration zone; contacting the liquid with mobile sponges in said zone; and aerating the liquid and the sponges to promote the growth and development, upon and within the sponges, of living organisms, which, by their life processes, react upon the impurities in the liquid being treated as it flows around and through the sponges and is alternately imbibed and expelled by them so as to change the composition and structure of these impurities and render them removable by sedimentation, immediately following this process.

2. A process of treatment of sewage, trade wastes or similar liquids which comprises; screening out the coarse material such as sticks, rags, garbage, etc.; settling out the easily settleable solids in sedimentation tanks; aerating the liquid, in an aeration tank; contacting the liquid with mobile sponges, which remain within the aeration tank and on the surfaces of which and within the pores of which are dwelling countless living organisms, which, by their life processes, react upon the impurities contained in the liquid and render them removable by sedimentation; and again settling to remove solids in a final sedimentation tank.

3. A bio-chemical aerobic process of secondary treatment of sewage, trade wastes or similar liquids which comprises circulating such a liquid through an aerated bed of mobile sponges within a compartment in an aeration tank.

4. A bio-chemical aerobic apparatus for secondary treatment of sewage, trade wastes or similar liquids which comprises a continuous-flow aeration tank, containing a compartment, a non-clogging, aerated filter bed composed of mobile sponges in said compartment, through which the sewage is caused to flow, a row of porous diffusors located below the bed for emitting a stream of air bubbles, and another row of porous diffusors along the opposite tank wall, emitting air bubbles for agitation, aeration and mixing of the liquid.

5. A bio-chemical aerobic apparatus for secondary treatment of sewage, trade wastes or similar liquids which comprises a continuous-flow aeration tank, divided in two portions, by a perforated vertical partition, extending from end to end of the tank, a row of air diffusors along one side of the tank, a large number of freely mobile sponges in the portion of the tank above the diffusors so that they will be in the path of a rising stream of air bubbles from the diffusors.

6. A bio-chemical aerobic apparatus for secondary treatment of sewage, trade wastes or similar liquids which comprises a continuous-flow aeration tank; a large number of freely moving sponges in said tank to furnish dwelling places for organisms, living on the exterior and interior surfaces and within the pores of said sponges; and means for aerating the liquid in said tank.

ALBERT L. THOLIN.